United States Patent
Weichmann et al.

(10) Patent No.: US 9,255,672 B2
(45) Date of Patent: Feb. 9, 2016

(54) HIGH LUMINANCE SOLID STATE LIGHT SOURCE

(71) Applicant: KONINKLIJKE PHILIPS N.V., Eindhoven (NL)

(72) Inventors: Ulrich Weichmann, Eindhoven (NL); Jens Pollmann-Retsch, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/397,095

(22) PCT Filed: Apr. 30, 2013

(86) PCT No.: PCT/IB2013/053421
§ 371 (c)(1),
(2) Date: Oct. 24, 2014

(87) PCT Pub. No.: WO2013/164767
PCT Pub. Date: Nov. 7, 2013

(65) Prior Publication Data
US 2015/0098207 A1    Apr. 9, 2015

Related U.S. Application Data

(60) Provisional application No. 61/641,362, filed on May 2, 2012.

(51) Int. Cl.
*F21V 9/16*     (2006.01)
*F21K 99/00*    (2010.01)
(Continued)

(52) U.S. Cl.
CPC .............. *F21K 9/56* (2013.01); *F21S 10/007* (2013.01); *F21V 13/08* (2013.01);
(Continued)

(58) Field of Classification Search
CPC ... F21S 10/007; G02B 26/008; G03B 21/204; G03B 33/08; G03B 21/2066; G03B 21/2033; F21K 9/56; F21V 13/08; F21V 29/2206; F21V 9/16; F21Y 2101/02; B60Q 1/0029; A61N 2005/067; B44F 1/00
USPC ............................................................ 362/84
See application file for complete search history.

(56) References Cited

U.S. PATENT DOCUMENTS 4,217,040 A  *  8/1980  Longerbeam .................... 353/46
2005/0073653 A1*  4/2005  Li .................................. 353/20
(Continued)

FOREIGN PATENT DOCUMENTS

DE  WO20120025141  *  3/2012
EP  2407825 A1       1/2012
(Continued)

*Primary Examiner* — Sean Gramling
*Assistant Examiner* — Omar Rojas Cadima

(57) ABSTRACT

A solid-state light source includes laser diodes that emit a laser beam with a first wavelength, a rotatable support that is arranged in a beam path of the laser beam and a reflector that is arranged between the laser diodes and the rotatable support. The rotatable support is formed of a ring or of an optically transparent disc. Further, the rotatable support is mounted to be rotatable around a rotation axis such that the laser beam impinges on a ring-shaped area of the rotatable support during rotation. Segments of the ring-shaped area include wavelength converting material that emits radiation of a second wavelength upon impingement of the laser beam. The rotatable support is mounted in a bearing that is arranged distant from the rotation axis to allow unhindered passage of the radiation directed by the reflector to the emission direction.

10 Claims, 1 Drawing Sheet

(51) Int. Cl.
  *F21S 10/00* (2006.01)
  *G02B 26/00* (2006.01)
  *G03B 21/20* (2006.01)
  *G03B 33/08* (2006.01)
  *F21V 13/08* (2006.01)
  *F21V 29/00* (2015.01)
  *F21Y 101/02* (2006.01)
  *F21V 29/502* (2015.01)

(52) U.S. Cl.
  CPC ......... *F21V 29/2206* (2013.01); *G02B 26/008* (2013.01); *G03B 21/204* (2013.01); *G03B 21/2066* (2013.01); *G03B 33/08* (2013.01); *F21V 9/16* (2013.01); *F21V 29/502* (2015.01); *F21Y 2101/025* (2013.01)

(56) References Cited

U.S. PATENT DOCUMENTS

2007/0019408 A1  1/2007  McGuire
2009/0284148 A1  11/2009  Iwanaga
2011/0116253 A1  5/2011  Sugiyama

FOREIGN PATENT DOCUMENTS

| EP | 2407826 A1 | 1/2012 |
| JP | 2005321547 A | 11/2005 |
| JP | 201213897 A | 1/2012 |
| WO | 2009069010 A1 | 6/2009 |

\* cited by examiner

HIGH LUMINANCE SOLID STATE LIGHT SOURCE

CROSS-REFERENCE TO PRIOR APPLICATIONS

This application is the U.S. National Phase application under 35 U.S.C. §371 of International Application No. PCT/IB2013/053421, filed on Apr. 30, 2013, which claims the benefit of U.S. Provisional Patent Application No. 61/641,362, filed on May 2, 2012. These applications are hereby incorporated by reference herein.

FIELD OF THE INVENTION

The present invention relates to a solid state light source comprising one or several laser diodes emitting a laser beam with a first wavelength and a rotatable support arranged in a beam path of the laser beam, wherein one or several sections of a ring-shaped area of the rotatable support comprise at least one wavelength converting material emitting radiation of a second wavelength or wavelength region different from the first wavelength upon impingement of the laser beam. Such a solid state light source emitting incoherent high luminance light can be used for a plurality of applications, for example for low Étendue optical systems like light-valve based projection, for spot lighting, for fibre lighting or for architectural lighting applications.

BACKGROUND OF THE INVENTION

Solid state light sources are currently entering many different lighting applications and replace incandescent and gas discharge lamps. Several applications are characterized by a small Etendue of the optical system, e. g. digital protection, optical fibres, architectural, entertainment or stage lighting. High intensity gas discharge lamps, like for example UHP- or Xenon-lamps are currently used in these demanding applications. Nevertheless, solid state light sources are also highly desired as the light source in this type of applications. LEDs are still limited in their brightness and therefore can not be adapted to low Étendue applications. Lasers provide a brightness that is by orders of magnitude higher than the typical requirements of optical applications with low Étendue. This means that there are basically no collection losses to be expected, which makes lasers a very attractive light source for such applications. However, suitable lasers are not available at all required emission wavelengths. Especially in the green wavelength range there is a lack of direct laser diodes with appropriate performance and costs. Furthermore, laser projection is still hampered by Speckle and other interference effects which require additional measures to ensure an acceptable picture quality. These effects are related to the small bandwidth (or high coherence) of lasers.

A new type of light source for projection was recently proposed in which a laser excites a phosphor layer that is placed on a rotating disc. This allows the design of a hybrid RGB-light source, where the blue light is generated by an array of laser diodes, the green light is generated by using—in a time sequential manner—a portion of the blue light to excite the phosphor and convert from the blue to the green, and the red light is generated with a red emitting LED. To keep the temperature of the phosphor in an appropriate range where the conversion efficiency is still good, the phosphor is placed on a rotating wheel. In this way the average laser power that hits the phosphor is spread out and kept low enough so that the temperature of the phosphor remains within an uncritical range. This type of light source makes good use of the laser properties, since it is possible to focus laser beams to very tiny spot sizes and excite only a small area on the phosphor. The smaller the spot size, the smaller is the optical Étendue into which the light is emitted and in this way, a low Étendue light-source is realized. Depending on the type of phosphor, this light-source emits a relatively broad spectrum and does not cause any disturbing Speckle-effects.

US 20110116253 A1 discloses such a solid state light source which includes a phosphor covered disc and a motor rotating the disc in the beam path of a semiconductor laser diode. The disc is made from an optically transparent material such as quartz glass and rotates around a central rotational axis. An optical lens system is arranged behind the rotating disc in order to collect the converted radiation emitted by the phosphor layer.

SUMMARY OF THE INVENTION

It is an object of the present invention to provide a highly efficient incoherent light source of high luminance with a more compact design.

The object is achieved with the solid state light source according to claim 1. Advantageous embodiments of this light source are subject matter of the dependent claims or are described in the subsequent portions of the description and preferred embodiments.

The proposed solid state light source comprises one or several laser diodes emitting a laser beam with a first wavelength, a rotatable support arranged in a beam path of the laser beam and a reflector arranged between the laser diode(s) and the rotatable support. The rotatable support is formed of a ring or of an optically transparent disc mounted to be rotatable around a rotation axis such that the laser beam impinges on a ring-shaped area of the rotatable support during rotation. The rotational axis of the rotatable support is arranged preferably substantially parallel to the optical axis of the impinging laser beam. One or several segments of the ring-shaped area comprise at least one wavelength converting material emitting radiation of a second wavelength or wavelength region different from the first wavelength upon impingement of the laser beam. This ring-shaped area may comprise only two segments or sections one of which comprises the wavelength converting material. The other may be designed reflective for the impinging laser radiation or may comprise a different wavelength converting material. The ring-shaped area may also have more than two segments comprising different wavelength converting materials, converting the impinging laser radiation to different wavelengths or wavelength ranges. The wavelength ranges may also overlap. When subdivided in more than two segments, segments of a wavelength converting material or reflecting sections may also repeat. In case of a rotatable support being made of an optically transparent disc, like a disc of quartz glass for example, only the small ring-shaped area comprises the wavelength converting material or reflecting property such that the area surrounded by the ring-shaped area remains optically transparent. The width of the ring or of the ring-shaped area should be adapted to the Étendue of the specific application. For typical business projectors as an example, with a light output of some 1000 lm, the width of the ring or of the ring-shaped area is preferably ≤5 mm. Cinema projectors with a light output of several 10000 lm will use a ring or a ring-shaped area with a width preferably ≤100 mm. The wavelength converting material may be embedded in the rotatable support or applied as a material layer on the surface of this support. The same applies to the reflecting segment(s).

The reflector arranged between the laser diode(s) and the rotatable support is designed to allow passage of the laser beam through a portion of the reflector, e.g. through the central portion, to collect the radiation emitted from a location of impingement of the laser beam on the ring-shaped area and to direct the collected radiation to an emission direction of the light source. The corresponding portion of the reflector may have an aperture to allow passage of the laser beam or may also be made of an optically transparent material not covered by a reflecting layer in this portion in order to form a window for the passage of the laser beam. The reflector collects the radiation emitted from the location of impingement of the laser beam on the ring-shaped area. This collected radiation may be converted radiation and/or reflected radiation of the laser beam depending on the instantaneous rotational position of the rotatable support. The laser beam is preferably focused on the ring-shaped area by an appropriate optics arranged between the laser diode(s) and the rotatable support.

In the proposed solid state light source the rotatable support is mounted in a bearing which is arranged distant from the rotation axis to allow unhindered passage of the radiation collected and directed by the reflector to the emission direction. The bearing guides the rotatable support during rotation. Also an actuator for driving or rotating the rotatable support is arranged outside of the optical path of the radiation directed by the reflector to the emission direction such that no light is blocked by the actuator, in particular a motor drive.

Due to the use of a reflector between the laser diode(s) and the rotatable support a very compact design of the proposed incoherent luminance light source is achieved. The rotatable support made of a ring or of an optically transparent disc in combination with the arrangement of the bearing for the rotatable support distant from the rotational axis allows a design of the reflector with a larger diameter (compared to constructions with a bearing at the rotational axis) without problems of shadowing of the collected light by the bearing and actuator. A larger reflector results in an improved collection efficiency and thus in a highly efficient light source. Since the laser light (after reflection at the ring-shaped area) is also collected by the reflector and directed to the same direction, converted and unconverted light follow the same beam path which leads to a simplified light source architecture.

The reflector is preferably designed to collimate the collected radiation. Such a reflector may for example comprise a parabolic shape. The reflector radius is preferably larger than the radius and smaller than the diameter of the ring-shaped area on the rotatable support. With these dimensions a blocking of light portions of the collected radiation by the bearing is avoided and the dimensions of the reflector are at the same time sufficiently high to achieve improved collection efficiency.

In an advantageous embodiment the rotatable support is formed of a ring which moves through the bearing. This embodiment has the advantage that the transmission of the collected radiation in the emission direction is not lowered by reflection losses of an optically transparent material as in case of an optically transparent disc.

The optically transparent disc or the ring may comprise a cooling structure like for example cooling fins arranged behind the ring-shaped area when seen in the emission direction. With such a cooling structure which may come in contact with a highly heat conducting member or heat sink at the bearings for heat dissipation allows a further improved cooling of the wavelength converting material.

These and other aspects of the invention will be apparent from and elucidated with reference to the embodiments described herein after.

BRIEF DESCRIPTION OF THE DRAWINGS

The proposed solid state light source is described in the following by way of example in connection with the accompanying drawings in further detail. The figures show.

DETAILED DESCRIPTION OF EMBODIMENTS

Figure 1:
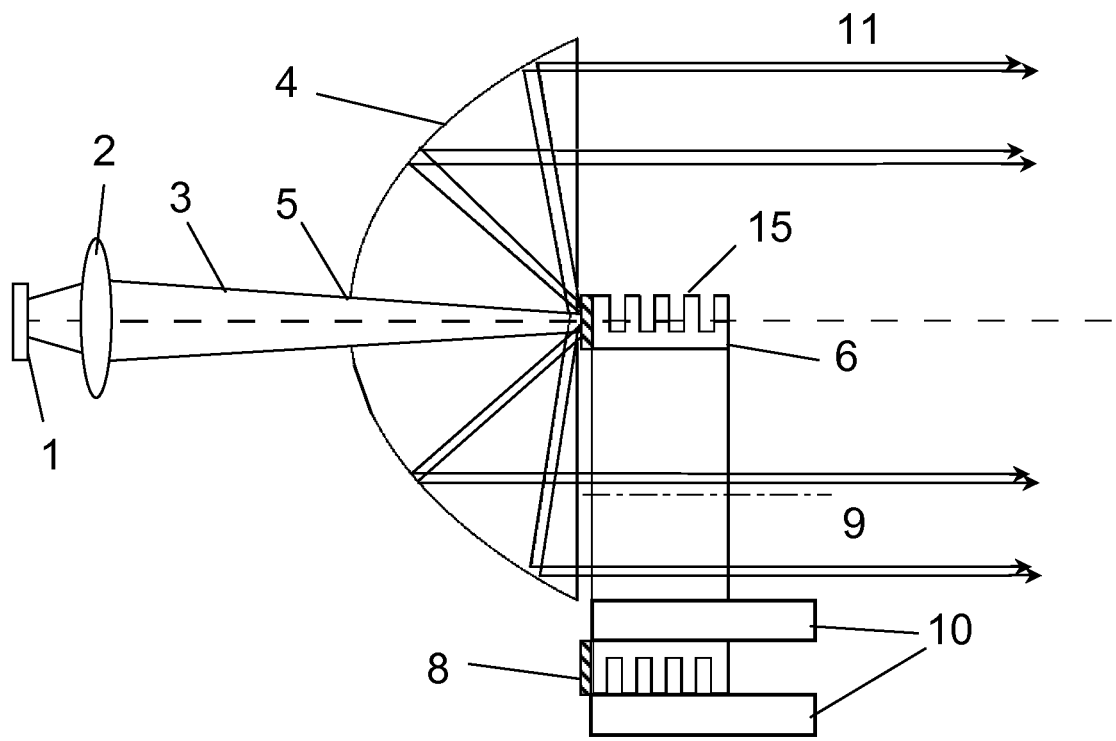
FIG. 1 a schematic side view of an example of the proposed solid state light source.

FIG. 1 shows a schematic side view of an example of the proposed solid state light source in which a rotating ring 6 forms the rotatable support. A reflector 4 is used in combination with a luminescent conversion material 8 which is placed on a side face of the rotating ring 6. An array of laser diodes 1 emits a laser beam of a first wavelength which is focused by a focusing optics 2 onto the ring-shaped side face of the rotating ring 6 which is at least partly covered by the luminescent conversion material 8. The reflector 4 comprises a small aperture 5 allowing the passage of the focused laser beam 3.

Generally, the laser beam can be emitted from a single laser diode or from an array of laser diodes. Typical power levels are in the order of several 10 W, depending on the application. The wavelength of the laser diodes can for example be in the range between 360 and 490 nm, where the most common wavelengths are 405 nm (used in Blu-ray optical storage) and around 450 nm, which wavelength is mostly used for display applications. Alternatively, in combination with suitable luminescent materials for upconversion as said converting luminescent materials, the laser wavelength can as well be in the infrared, e. g. around 980 nm. With the focusing optics 2, the laser beam 3 is focused to a small size spot with a typical diameter in the order of about 1 mm. Depending on the Étendue of the application, this diameter can vary.

Due to the impingement of the focused laser beam 3 on the luminescent conversion material 8, radiation with a second wavelength or in a second wavelength region is emitted towards the reflector 4. This radiation 11 is collected by the reflector 4 and directed to the emission direction as indicated in FIG. 1. Depending on the luminescent conversion material 8 or on the segment of the ring-shaped area on the rotating ring 6 on which the focused laser beam 3 impinges, also radiation of the laser beam, i. e. radiation of the first wavelength is reflected towards the reflector 4 and thus collected and directed by the reflector 4 to the emission direction. In this way, converted and unconverted light follow the same beam path.

The rotating ring 6 is driven by a motor (not shown in the figures) to rotate around rotation axis 9 in order to avoid heating of the luminescent material by the impingement of the laser beam above a critical temperature. The bearing 10 for guiding and driving the rotating ring 6 around the rotation axis 9 is arranged distant from the rotation axis outside of the beam path of the radiation collected by reflector 4 as can be recognized from FIG. 1. Therefore, the collected radiation is not blocked by the bearing and the motor for driving the ring. This allows the use of a relatively large reflector which would not be possible for cases in which the rotatable support would comprise a bearing and motor at the rotation axis 9. A larger reflector allows for better light collection and results in less aberration for the reflected beam. The driving of the rotating ring 6 can be achieved for example by help of an appropriate motor driven gear engaging with an appropriate structure at the circumference of the ring.

The rotating ring 6 may also comprise a cooling structure 15 of a highly heat conducting material. In this example, this cooling structure 15 is formed of several cooling fins and is arranged behind the ring-shaped area covered by the luminescent conversion material 8. By bringing this cooling structure in contact with other highly heat conducting materials in the bearing 10, an improved cooling of the ring can be achieved.

Figure 2:
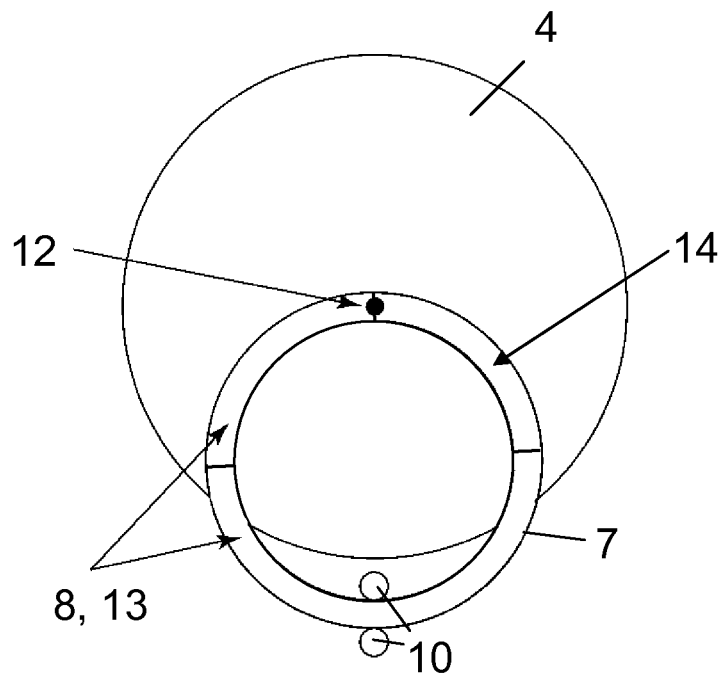
FIG. 2 a schematic top view of the example of FIG. 1.

FIG. 2 shows a top view from the emission direction onto the solid state light source of FIG. 1. In this top view, the outer diameter of reflector 4 can be recognized which is substantially larger than the diameter of the ring-shaped area 7 of the rotating ring 6. The ring-shaped area 7 of the rotating ring 6 in this example comprises three different segments with different luminescent converting materials 8, 13, 14. The figure also shows the laser focus 12 on the ring-shaped area 7. During rotation of the rotating ring 6 this laser focus 12 sequentially impinges on the different segments and thus produces different wavelengths of the converted radiation. One of the three segments may also only comprise a reflecting layer which then reflects the impinging laser radiation to the reflector 4.

Different conversion materials can be used depending on the chosen laser wavelength and desired emission spectrum. Exemplary materials can be for example phosphor powders in suspension, phosphor layers or even ceramic plates or glasses. Without excluding other materials and wavelength combinations, some examples are given in the following table.

| laser wavelength $\lambda_{exc}$/nm | material | composition | primary colour |
|---|---|---|---|
| 405 | BAM | $BaMgAl_{10}O_{17}$: Eu | blue |
| 450 | LuAG | $Lu_3Al_5O_{12}$: Ce | green |
| 450 | YAG | $Y_3Al_5O_{12}$: Ce | yellow |
| 405/450 | SSONE | $SrSi_2O_2N_2$: Eu | green |
| 405/450 | BSONE | $Ba_3Si_6O_{12}N_2$: Eu | green |
| 405/450 | BSSNE | $(Ba,Sr)_2Si_5N_8$: Eu | orange |
| 405/450 | ECAS | $CaSiAlN_3$: Eu | red |
| 980 | | Er, Yb: ZBLAN | green |
| 980 | | Er, Yb: $NaYF_4$ | green/red |
| 980 | | Tm, Yb: $NaYF_4$ | blue |

Different sections or segments on the ring-shaped area 7 can be covered with different conversion materials, e. g. a scattering segment to reflect the blue pump radiation, a segment that converts to the green and another segment that converts to the red. In this way, a white light source can be realized where the color points can be adjusted by the relative sizes of the segments and by driving the laser synchronized to the different segments on the ring.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. In particular, all claims of the light source can be freely combined. Any reference signs in the claims should not be construed as limiting the scope.

LIST OF REFERENCE SIGNS 1 laser diode(s)
2 focusing optics
3 focused laser beam
4 reflector
5 small aperture
6 rotating ring
7 ring-shaped area
8 luminescent conversion material
9 rotation axis
10 bearings/driving
11 converted/reflected radiation
12 laser focus
13 luminescent conversion material
14 luminescent conversion material
15 cooling structure

The invention claimed is:

1. A solid state light source comprising:
a laser diode configured to emit a laser beam with a first wavelength;
a rotatable support arranged in a beam path of the laser beam,
said rotatable support being formed of a ring to be rotatable around a rotation axis, wherein the laser beam impinges on a ring-shaped area of the rotatable support during rotation;
a segment of said ring-shaped area comprising a wavelength converting material emitting radiation of a second wavelength different from said first wavelength upon impingement of the laser beam; and
a reflector arranged between the laser diode and the rotatable support, the reflector being configured:
to allow passage of the laser beam through a portion of the reflector,
to collect the emitted radiation from a location of impingement of the laser beam on the ring-shaped area to form a collected radiation, and
to direct the collected radiation to an emission direction of the solid state light source,
wherein said rotatable support is mounted in bearings arranged distant from the rotation axis to allow unhindered passage of the radiation directed by the reflector to the emission direction, the bearings comprising a first bearing configured to contact an inner surface of the rotatable support and a second bearing configured to contact an outer surface of the rotatable support, the inner surface being closer to a center of the rotatable support than the outer surface.

2. The solid state light source according to claim 1, wherein the rotatable support is configured to move through the bearings.

3. The solid state light source according to claim 1, wherein an actuator for rotating the rotatable support is arranged outside an optical path of the radiation directed by the reflector to the emission direction.

4. The solid state light source according to claim 1, wherein said wavelength converting material is a luminescent material.

5. The solid state light source according to claim 1, wherein the reflector is configured to collimate the collected radiation.

6. The solid state light source according to claim 1, wherein the reflector comprises an aperture to allow the passage of the laser beam.

7. The solid state light source according to claim 1, wherein the reflector has a reflector radius which is larger than a radius of the ring-shaped area on the rotatable support and said reflector radius is smaller than a diameter of the ring-shaped area on the rotatable support.

8. The solid state light source according to claim 1, further comprising a further segment of said ring-shaped area, said further segment comprising a further wavelength converting material different from the wavelength converting material, the further wavelength converting material emitting radiation of different wavelengths or wavelength regions different from at least one of the first and second wavelengths.

9. The solid state light source according to claim 1, wherein the rotatable support comprises a cooling structure coming in contact with a heat dissipating member when moving through the bearings.

10. The solid state light source of claim 1, wherein the first bearing is further configured to be aligned with the second bearing.

* * * * *